United States Patent [19]

Deman et al.

[11] Patent Number: 4,562,571
[45] Date of Patent: Dec. 31, 1985

[54] SPEECH PROCESSING DEVICE FOR RADIOELECTRIC EQUIPMENT ADAPTED FOR SPEECH TRANSMISSION AND RECEPTION

[75] Inventors: Pierre Deman, Paris; Jean Potage, Franconville, both of France

[73] Assignee: Thomson CSF, Paris, France

[21] Appl. No.: 558,888

[22] Filed: Dec. 7, 1983

[30] Foreign Application Priority Data

Dec. 10, 1982 [FR] France ............................. 82 20764

[51] Int. Cl.$^4$ .............................................. H04B 3/20
[52] U.S. Cl. .......................................... 370/7; 370/6; 375/122; 333/14; 179/170.2; 381/110
[58] Field of Search ...................... 370/7, 6; 375/122; 455/72; 333/14; 381/110, 29; 179/170.2

[56] References Cited

U.S. PATENT DOCUMENTS

| | | | |
|---|---|---|---|
| 3,377,559 | 4/1968 | Stewart | 333/14 |
| 3,462,561 | 8/1969 | Deman | 179/170.2 |
| 3,885,111 | 3/1975 | Ishigami et al. | 333/14 |
| 4,123,711 | 10/1978 | Chow | 455/63 |
| 4,271,499 | 6/1981 | Leveque | 370/7 |

FOREIGN PATENT DOCUMENTS 775918  5/1957  United Kingdom .................. 333/14

Primary Examiner—Joseph A. Orsino, Jr.
Assistant Examiner—Timothy K. Greer
Attorney, Agent, or Firm—Cushman, Darby & Cushman

[57] ABSTRACT

The device is of the type comprising a circuit for compressing the dynamic of the speech signal before transmission of the signal at constant level and an expander for re-establishing at reception the speech level before compression thereof. A logic filtering circuit controls the compression circuit by constant attenuation steps depending on the speech level. A selector comparator circuit coupled by a first input to an output of the logic filtering circuit and by a second input to the output of a device controlling the expander compares the attenuation values supplied by the logic filtering circuit with those supplied by the device controlling the expander and adjusts the attenuation value of the compression circuit to the greatest of the attenuation values supplied by the logic filtering circuit or by the control device of the expander.

14 Claims, 4 Drawing Figures

SPEECH PROCESSING DEVICE FOR RADIOELECTRIC EQUIPMENT ADAPTED FOR SPEECH TRANSMISSION AND RECEPTION

BACKGROUND OF THE INVENTION

1. Field of the Invention

The present invention relates to a speech processing device for radioelectric equipment adapted for transmission and reception of voice signals, usable more especially in radiotelephony.

2. Description of the Prior Art

Analog speech processing systems are known which transmit by radio, by means of variable attenuation at transmission, a practically constant level of the voice signal such that the level can be maintained for a time close to a few tens of milliseconds. One such known system is LINCOMPEX which substantially improves the signal/noise ratio obtained at reception. In these systems, the value of the attenuation introduced at transmission is transmitted through a frequency multiplexed auxiliary channel. By frequency modulation of a sub-carrier situated at the top of the telephone band, so as to control an expander situated at the level of the receiver, where the expander is an attenuator operating reversely to the transmitter attenuator, the speech level existing before compression of the voice signal may be found. These purely analog systems are used in radiotelephony in the decametric wave range. An improvement to the LINCOMPEX system is known under the name SYNCOMPEX. In the SYNCOMPEX system the voice signal is processed and transmitted by packets of finite duration (13.33 milliseconds) over a main channel and over an auxiliary frequency radioelectric channel which transmits attenuation values in digital form. The corresponding codes are transmitted by a frequency jump modulation system of the "FSK" type, i.e. frequency shift keying, which operates with diversity coupling on two sub-carriers introduced into the speech band.

Although providing good performance, these systems do not suppress the echo phenomena generated either by cross-talk between the transmission and reception channels or else by microphones placed close to reception loud-speakers.

SUMMARY OF THE INVENTION

The aim of the invention is to overcome the above-mentioned disadvantages.

To this end, the invention provides a speech processing device for radioelectric equipment adapted for voice signal transmission and reception, comprising a circuit for compressing the voice volume range of the voice signal, formed by at least one variable transmission attenuator, for maintaining the voice level signal substantially constant during transmission of the voice signal, and an expander for re-establishing, at reception, the voice level of the voice signal before compression thereof, as well as a device for controlling the expander responsive to the value of the attenuation introduced by the transmission attenuator and transmitted over an auxiliary radio-electric channel. A logic circuit filters the transmission voice level signal so as to control the compression circuit, by substantially constant attenuation steps, as a function of the voice level to be transmitted present at the input of the device, so as to maintain the voice level substantially constant at the output of the device and for transmitting, over the auxiliary channel, the corresponding attenuation values. A selector comparator circuit, coupled by a first input to an output of the logic filtering circuit and by a second input to an output of the device controlling the expander, compares the attenuation values transmitted by the logic filtering circuit with the attenuation values received by the device controlling the expander. The selector comparator circuit is also coupled to the control inputs of at least one transmission attenuator. The results of the comparison are used to adjust the attenuation value of the attenuator to the attenuation value derived by the output of the logic filtering circuit, if the value of the attenuation delivered by the logic filtering circuit is greater than the attenuation value delivered by the output of the device controlling the expander. However, the attenuation value of the attenuator is adjusted to the value of the attenuation delivered by the output of the device controlling the expander. If the attenuation value delivered by the output of the control device of the expander is greater than the attenuation delivered by the output of the logic filtering circuit.

In another embodiment of the invention, the device also includes a circuit for detecting the voice activity, placed at the level of the transmission circuits, so as to prevent the occupation of either channel by insignificant transmissions and which, in combination with the selector comparator circuit, avoids untimely tripping of the voice activity detector on echos which would cancel out the major part of the efficiency of the detector.

BRIEF DESCRIPTION OF THE DRAWINGS

Other features and advantages of the invention will appear also from the description which follows, made with reference to the accompanying drawings, given solely by way of example and in which.

DESCRIPTION OF THE PREFERRED EMBODIMENT

Figure 1:
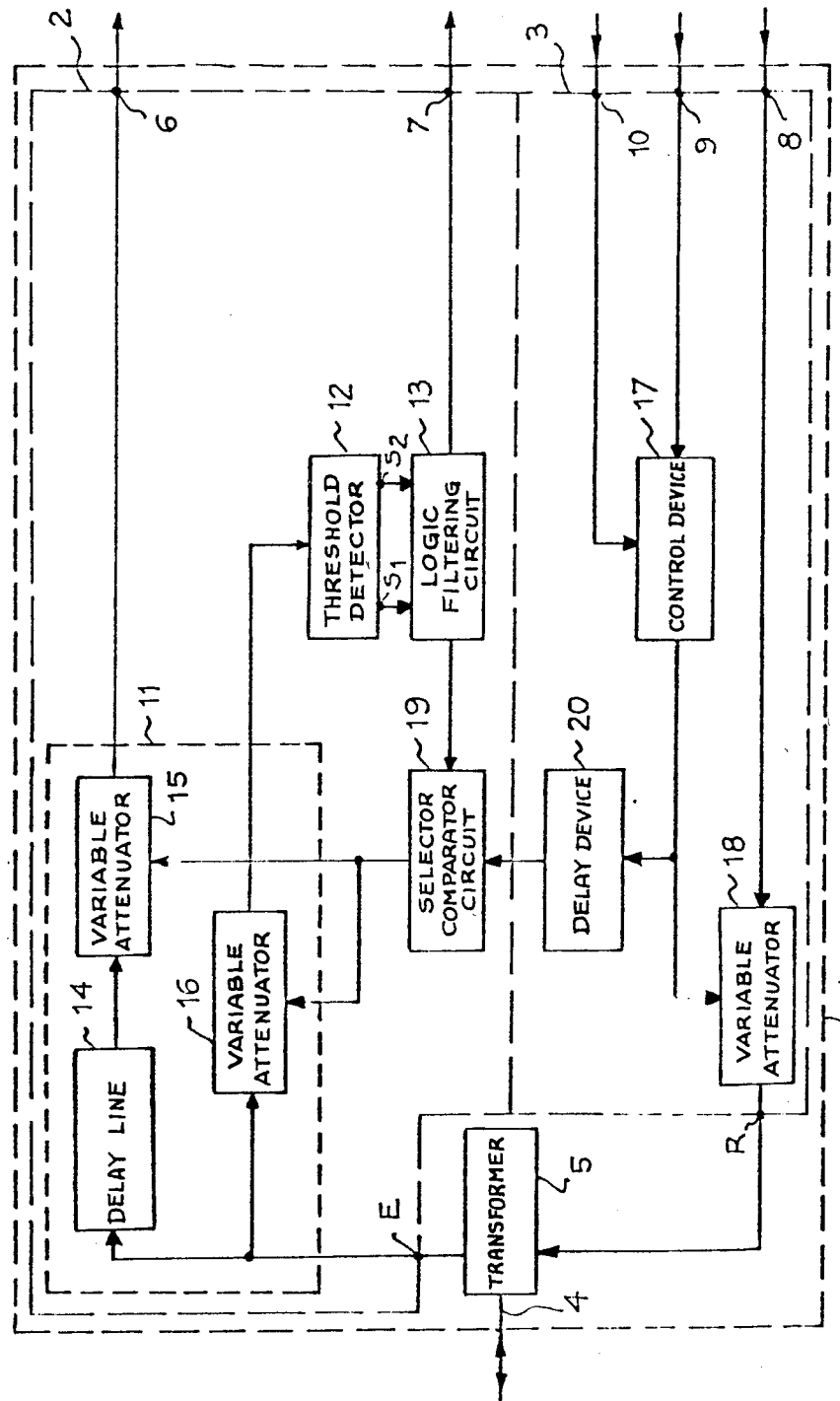
FIG. 1 shows the general diagram of the device of the invention placed in a radio terminal, with simultaneous and permanent transmission-reception in both transmission directions (duplex mode)

The speech processing device 1 of the invention, shown in FIG. 1 inside a broken line rectangle, comprises a transmission part 2 and a reception part 3, also shown inside the broken line. Device 1 is connected to a telephone line 4 over which voice signals are transmitted through a hybrid differential transformer 5. The input of transformer 5 which is not connected to the telephone line 4 is direcly connected to the output R of the reception part 3. The the output S of the transformer 5 is connected directly to the input E of the transmission part 2. The transmission part 2 of the device is connected by an output 6 to the transmission radioelectric circuit of the transmitter (not shown) and transmits to this latter a voice signal whose level is maintained substantially constant. The transmission part 2 also includes an output 7 which is connected to the transmission circuit of the transmitter (not shown) for transmitting the coded level information over an auxiliary channel of the transmitter (not shown). The reception part 3 comprises an input 8 which is connected to the reception circuit (not shown) of the transmitter-receiver, for receiving the demodulated voice signal. The reception part also comprises an input 9 and an input 10. Input 9 is connected to the reception circuits of the transmitter-receiver (not shown) charged with demodulating the information transmitted over the auxiliary level channel. Input 10 is connected to the demodulation circuit of the receiver and receives a weighting signal "e". The transmission part 2 is formed by a compression circuit 11, also shown inside a broken line, which is connected to a threshold detector 12 and a logic filtering circuit 13. The compression circuit 11 is formed by a delay line 14, situated between the input E of the transmission part and the input of a variable attenuator 15. The compression circuit 11 also includes a variable attenuator 16 whose input is connected to the input E of the transmission part 2 and whose output is connected to the input of the threshold detector 12. The threshold detector 12 is connected by its outputs S1 and S2 to respective inputs of the logic filtering circuit 13. The logic filtering circuit 13 is connected by an output to the output 7 of device 1. The output of the variable attenuator 15 is connected to the output terminal 6 of the device for transmitting the transmitted constant level signal. The reception part 3 comprises a control device 17 and an expander 18 which is formed by a variable attenuator. The control device 17 is connected by two inputs to the inputs 9 and 10 of device 1 which receive respectively the level variation information transmitted over the auxiliary channel and the weighting signal "e". The control device 17 has an output connected directly to the control input of attenuator 18 for providing adjustment of the attenuation values of this latter. The variable attenuator 18 has an input connected directly to the terminal 8 of device 1, for receiving the voice signal demodulated by the circuits of the receiver (not shown) and an output connected directly to the output terminal R of the reception part. Device 1 also comprises a selector comparator circuit 19 situated equally well in the transmission or reception parts and coupled by a first output to a second input of the logic filtering circuit 13 and by a second input to an output of the control device 17 of the expander, for comparing the attenuation values transmitted by the logic filtering circuit with the control attenuation values of attenuator 18 delivered at the corresponding output of the expander control device 17. The selector comparator 19 is coupled to the corresponding output of the expander control device 17 through a delay device 20 formed by a delay line or by a monostable circuit. The output of the selector comparator 19 is also connected to the attenuation control inputs of the variable attenuators 15 and 16.

It will be noted that, in FIG. 1, the connections between the circuits 13,19,15 and 16 on the one hand, and 17,18,20 and 19 on the other are shown by a simple line. The description which follows shows that these connections are formed by as many conductors as there are incrementation steps in the variable attenuators 15, 16 and 18.

The operation of the device shown in FIG. 1 is described below. The voice signal which is transmitted by the telephone channel 4 is applied to the input E of the reception part 2 through a hybrid transformer 5. The voice signal passes through the compression circuit 11, successively through the delay line 14, the attenuator 15 and exits at the terminal 6 of the device 1. The threshold circuit 12 indicates to the logic circuit 13, through outputs S1 and S2, the power level changes of the undelayed voice signal, passing through the attenuator 16. The logic filtering circuit 13, depending on the level changes detected by the threshold detector 12, controls attenuators 15 and 16 and codes the level information which is transmitted through terminal 7.

At reception, the voice signal, demodulated by the circuits of the receiver (not shown) is applied to terminal 8 and thus to the input of the variable attenuator 18 which is controlled by the control device 17. The variable attenuator 18 which is controlled by the control device 17 provides expansion of the voice volume range of the voice signal, for reconstructing, at the input of the hybrid transformer 5, the voice signal with its reconstituted original voice volume range. The control device 17 receives the level attenuation variation decisions transmitted over the auxiliary level channel at terminal 9 and the weighting signal "e" which will, for example, be a simple signal cancelling the modification of the attenuation of the level received. This latter solution will be applicable, particularly whenever the radio transmisison is affected by fading and whenever the level information transmitted over the auxiliary level channel is interlaced with a digital frame containing the voice signal. Thus, in a speech transmission at 16 Kbits per second, binary cancelling information may be transmitted every 48 bits over the level channel. It will therefore be possible in this case to provide a valid qualification signal for the 49 bits should fading occur. The decision will be taken by taking into account the restraints imposed for transmission of the signal so as to give back to the cancelled binary elements values introducing the minimum of components situated in the melodic frequency band. The attenuators 15,16 and 18 used for the preferred embodiment of the invention, will preferably be static incremental attenuators formed like a weight box, allowing a given cadence to be introduced step by step, a differential attenuation for example of 0, +3, −3 decibels every six milliseconds. To change the attenuation ratio, a code of the "delta" type may be used for coding the level information. The controls supplied by the filtering logic and by the interpolation circuit will only be made effective in this latter case when two consecutively received level coding signals have the same value. Thus, if A and Z designate respectively the "delta" coding signals used, an increase or reduction of the speech level above or below acceptable thresholds will be coded by consecutive signals ZZ for commanding a +3 decibel attenuation and two consecutive signals AA for commanding a −3 decibel attenuation. No attenuation variation will be commanded when the consecutive signals received are combined in the way ZA or AZ. The transmission of the signals A and Z over the auxiliary channel will be effected for example by using a sub-carrier $f_o$ for transmitting signal A and a frequency sub-carrier $f_1$ for transmitting the signal Z. In a simple embodiment of the invention, the control of the attenuation levels of the attenuators will consist in only taking into account the level variations corresponding to the syllabic terms of the speech, while respecting the consecutive alternating increasing and decreasing phases in the voice signal, the command for increasing being effected when the peak value of the voice signal detected by detector 12 exceeds a first threshold, the command for decreasing being effected when the peak signal of the speech signal detected by the threshold detector 12 is less than a second threshold, for example, less than the first threshold by 3 decibels. Another embodiment of the invention may also be provided by using "delta" type coding and decoding methods already described in French Pat. No. 82 18905 filed on Nov. 10, 1982 in the name of the Applicant. By using the previously described "delta" coding, the variation commands will be transmitted, for example, in the form of a succession of consecutive signals AA for commanding an attenuation reduction of −3 decibels when the speech signal is less than the second threshold and, in the form of two consecutive signals ZZ for commanding an attenuation increase of +3 decibels when the speech signal is greater than the first threshold. When the level of the voice signal is situated between the first and the second threshold, the logic filtering circuit will not modify the value of the attenuations of the attenuators, the succession of signals ZA transmitted by the logic filtering circuit 13 is applied to terminal 7 of the device so as to be conveyed then over the auxiliary frequency channel, and the attenuation value is applied to a first input of the selector comparator 19. The attenuation variations transmitted by the auxiliary channel are also received at terminal 9 of the device and applied to the corresponding input of the control device 17 which retransmits the attenuation values obtained by integration to the second input of the selector comparator 19 through the delay device 20. The selector comparator 19 compares the attenuation values which are applied to its first and second inputs respectively by the logic filtering circuit 13 and by the attenuation control device 17. The selector comparator 19 selects from among the two attenuation values applied to its inputs, the one which presents the highest value is applied to to the respective control inputs of the variable attenuators 15 and 16. The delay device 20 is designed so as to allow the attenuation values received by the control device 17 to pass without delay when these values correspond to an increasing phase of the voice signal and delay on the other hand, by a constant value, the application of the attenuation values to the second input of the selector comparator 19 when these values correspond to a decreasing phase of the speech signal. Delay devices of this type are known to a man skilled in the art and consequently their construction does not need to be given in greater detail. The delay of device 20 is determined so as to provide attenuation of the echo whatever the outgoing-return transit time of the signal over the link 4 between transformer 5 and the radio terminal equipment (not shown). A delay of 50 milliseconds will generally be sufficient in most applications, for long links are generally already equipped with echo suppression.

It can be seen from the embodiment which has just been described that, for every constant level signal applied to the input 8 of the reception part, there corresponds a constant level signal transmitted to the output 6 by the transmission part of the device since the sum of the attenuation introduced by the attenuator 18 and compressor 11 is constant. The value chosen for this sum should however take into account the attenuation caused by the differential transformer 5 so that the level of the signal leaving from output 6 remains less than the one which would correspond to a voice signal transiting over line 4 so that the selector comparator 19 chooses, for controlling attenuators 15 and 16, the output signal of the delay device 20.

Therefore, when a significant voice signal is received at input 8 and in the absence of a voice signal over link 4, the threshold detector 12 detects nothing and the logic filtering circuit applies to outut 7 a signal corresponding to a permanent decreasing phase of the signal.

Figure 2:
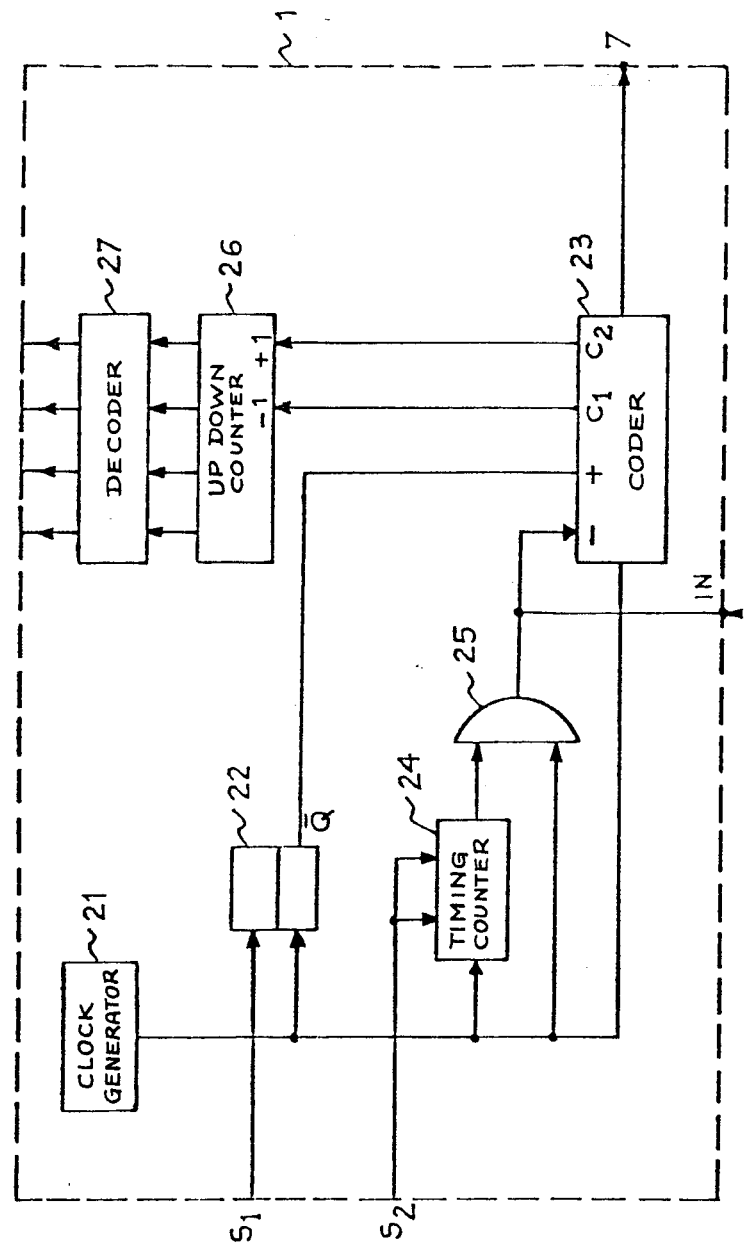
FIG. 2 is an enbodiment of the logic filtering circuit of the invention associated with a differential coder.

The logic filtering circuit 13 will now be described with the help of the diagram shown in FIG. 2. This circuit comprises a clock generator 21, a flip-flop 22 a coder 23, a timing counter 24 connected to the input of coder 23 through an AND gate 25, an up-down counter 26 and a decoder 27. Flip-flop 22 is connected by its control input to the output S1 of the threshold detector 12 of FIG. 1 and is connected by its reset input to the output of the clock generator 21. The complemented $\overline{Q}$ output of flip-flop 22 is connected to the "+" input of the coder 23. The timing counter 24 is formed by two flip-flops (not shown) whose reset inputs are connected to the output S2 of the threshold detector 12 of FIG. 1, and whose counting input is connected to the output of the clock generator 21. Gate 25 is a two-input AND gate, a first input of which is connected to the output of counter 24 formed by the output of the last flip-flop, the second input being connected to the output of the clock generator 21. The output of the AND gate 25 is connected to the input marked "−" of coder 23. Coder 23 is also connected by its H input to the output of the clock generator 21 and by its input marked "−" to an input marked "IN" of the filtering logic whose function will be explained below in connection with FIG. 4. The outputs C1,C2 of coder 23 are connected respectively to the down-count "−1" and up-count "+1" inputs of the up-down counter 26. The outputs of counter 26 are applied to an input of a decoder 27 which delivers at its outputs successive attenuation weights of 3 dB, 9 dB, 12 dB, etc. to the control inputs of the variable attenuators 15,16 of FIG. 1.

From the threshold overshoot signals supplied by the threshold detector of FIG. 1, the filtering logic allows the variable attenuators of FIG. 1 to be commanded and the digital coding of the auxiliary channel to be provided by coder 23 connected to the output 7 of the transmission part. The clock generator 21 supplies, at a timing of for example 6 milliseconds, binary signals for timing the level matching information transmitted over the auxiliary channel. If the amplitude of the voice signal, measured by the threshold detector 20 of FIG. 1, overshoots the upper threshold, the threshold detector 12 supplies, at its output S1, a first signal which causes flip-flop 22 to switch. If the change of state of flip-flop 22 is effected in the time interval separating two consecutive clock pulses, the resetting to zero of flip-flop 22 at the clock pulse following the pulse of the first switching of flip-flop 22 caused by the clock signal applied to the reset input, causes a positive pulse to be sent to the "+" input of coder 23.

If the amplitude of the voice signal measured by the threshold detector 12 understoots the lower threshold, a signal is applied by the output of the threshold detector to the reset input of counter 24 which is re-initialized for another count. In this embodiment, counter 24 is formed by two flip-flops so as to count three successive clock steps of 6 milliseconds. The count of counter 24 takes place each time that the syllabic level of the voice signal measured by the threshold detector 12 is less than the second threshold. In fact, in this case, control of the opening of gate 25 takes place after three steps of the clock signal supplied by the clock generator 21, and as long as gate 25 is open, a clock signal is applied to the input marked "−" of coder 23. Thus, when the level of the voice signal is in an increasing period and is greater than the first threshold, a pulse is applied to the input marked "+" of coder 23 and in the opposite case, when the level of the voice signal is in a decreasing period and is less than the second threhsold, a pulse is applied to the "−" input of coder 23. It will however be noted that the clock pulse is only applied to the input marked "−" of coder 23 if a sufficient time of eighteen milliseconds has already elapsed from the time when the level of the voice signal dropped below the second threshold.

Thus, if the voice signal undershoots, at least once during 18 milliseconds, the lower threshold without overshooting the upper threshold, no + or − command is transmitted to coder 23.

Coder 23 is a known coder of the "delta" code type which emits, when no signal is applied to its "+" and "−" inputs, an alternating succession of A and Z signals corresponding to the previously described "delta" code. On receiving a pulse coming from flip-flop 22 applied to the "+" input, coder 23 delivers at output 7 of device 1 a succession of consecutive signals ZZ by inverting for example the signal being transmitted if the preceding signal is a Z signal or by staggering the sequence ZZ by a bit if the preceding signal is a signal A. On reception of a signal supplied by gate 25 at the "−" input of coder 23, the output of coder 23 emits a succession of consecutive signals AA by inverting for example the signal to be emitted if the preceding bit is a signal A and by staggering the succession of the signals AA if the preceding signal is a Z signal. In the absence of a pulse applied to the "+" and "−" inputs of coder 23, this latter transmits an alternation of signals A and Z at its output 7 and the up-down counter 26 remains in a fixed position. On the other hand, at each pulse applied to the "+" input of coder 23, an incrementation signal is supplied by the output C2 of coder 23 to the input marked "+1" of the up-down counter 26, and at each pulse applied to the input marked "−" of coder 23, a signal is supplied by the output C1 of coder 23 at the decrementation input marked "−1" of the up-down counter 26. To ensure synchronism of the attenuation commands of the attenuators and of the code transmitted over the auxiliary channel, coder 23 transmits simultaneously the signals for controlling the up-down counter 26 with the code signals transmitted over the auxiliary channel.

Figure 3:
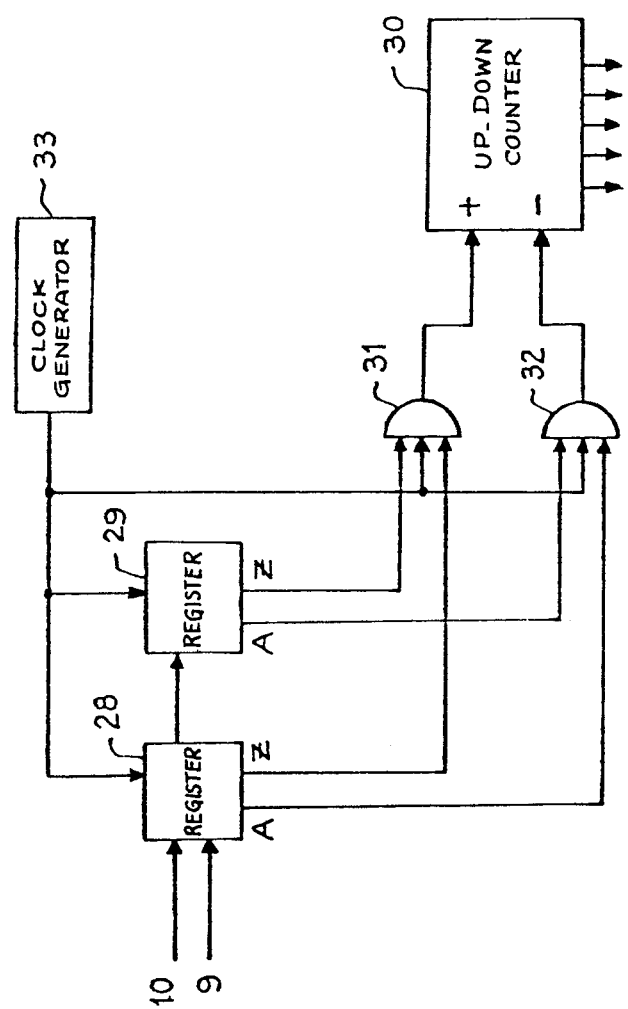
FIG. 3 is a diagram showing the device for controlling the expander.

One embodiment of the control device 17 will now be described with reference to the diagram shown in FIG. 3. The control device 17 comprises an assembly of registers 28 and 29, an up-down counter 30 controlled at its up-count "+" and down-count "−" inputs by the outputs of the AND gates 31 and 32 as well as a reception clock generator 33 which may advantageously be identical to the transmission clock 21, so as to provide synchronization of the read-out and write-in of data in registers 28 and 29 and the progression of the up-down counter 30. Register 28 has its input connected directly to the input 9 of device 1 of FIG. 1 for receiving from the demodulator of the receiver (not shown) the signals A or Z transmitted over the auxiliary channel and whose combinations allow the increasing or decreasing periods of the voice signal to be recognized. Register 28 is also connected to the input 10 of device 1 of FIG. 1 for receiving, if necessary, an "e" cancelling binary signal cancelling, when it is present, the decision corresponding to the signal A or Z present at input 9. This "e" weighting signal may be supplied in a way known per se by the demodulation circuits (not shown) of the receiver whenever there is doubt about the quality of the signals A and Z received, caused either by an unduly high radioelectric noise present on the transmission channel or by a period of fading of the radioelectric signal received. The signals A and Z received are first of all stored on the appearance of a clock signal supplied by clock generator 33 in register 28 then transferred from register 28 to register 29. Register 28 contains the signals A and Z which are being received and register 29 contains the signals A and Z previously received. The AND gate 31 has three inputs, the first and second inputs are connected respectively to the outputs of registers 28 and 29 storing the signal Z and a third input is connected to the output of clock generator 33. The clock signal supplied by the clock generator 33 is retransmitted to the output of the AND gate 31 when two signals Z are stored simultaneously in registers 28 and 29, to be applied to the up-count input marked "+" of the up-down counter 30. Similarly, the AND gate 32 has three inputs, the first and second inputs are connected respectively to the outputs of registers 28 and 29 which transmit the signals A and are connected by a third input to the clock input 33. The AND gate 32 transmits the clock signal supplied by the clock generator 33 to the input marked "−" of the up-counter 30 when two A signals are simultaneously stored in registers 28 and 29.

The operation of control device 17 will now be described. The binary decision A or Z given by the value of the signal present on line 10 is introduced into the first register 28 and the arrival, should this be the case, of a weighting signal e on line 9 causes the decision to be cancelled. At each clock pulse supplied by generator 33, the contents of register 28 are transferred to register 29. When two consecutive signals Z are received respectively in registers 28 and 29, the AND gate 31 transmits an increase to the up-down counter 30. In the opposite case, when two consecutive A signals are received and stored in registers 28 and 29, the AND gate 32 transmits a decrease pulse to the up-down counter 30. The variable attenuator 18 of FIG. 1 is then commanded by the state of the outputs of the up-down counter 30 and a 3 decibel attenuation is added or taken away for each variation of the state of this latter.

The device of the invention which has just been described is advantageously applied to the case where the radioelectric link is in duplex mode with permanent transmission and reception at both ends of the transmission channel and to the case where the radioelectric transmitter is transmitting only during the periods of voice activity.

In the first case, the echo is conveyed at reduced power and the expander of the reception part at the other end of the transmission channel is maintained at its maximum attenuation level; the echo is consequently suppressed by the action of the expander at the other end. When the voice signal level over link 4 is such that it overshoots, by a sufficient amount, the level of the echo to cause the threshold detector 12 to operate, the transmission is resumed normally in this transmission direction. It will be noted in this case that transmission in the other direction will be interrupted by the anti-echo effect initiated by the selector comparator at the other end.

In the second case where the radioelectric transmitter is transmitting only during periods of voice activity, the anti-echo effect described above results in transforming the duplex link into an automatic alternating link which has nevertheless the possibility of being able to interrupt its interlocutor by raising its speech level.

A problem may however arise in the case where a device operates in a transmission system with automatic alternation, where it is not possible to receive information when the device is transmitting. In this case it is no longer advantageous for the user to keep the possibility of interrupting the distant party in communication who is transmitting by raising his own voice level, for if the distant party is transmitting, he can no longer listen and is then incapable of hearing an interruption signal. On this assumption, the selector comparator 19 loses its interest and may be advantageously replaced by blocking the detection of vocal activity at one end of the channel for the signal arriving at the input 9 of the reception part of this end.

On the other hand, if in a system, the detection of voice activity is used for suppressing occupation of the channel by insignificant transmissions, the action of the selector comparator 19 combined with that of a voice activity detector will be advantageous in preventing triggering of the voice activity detector on echos which would cancel out a part of its advantage. This case may be met with more especially in frequency jump radiotelephone systems with multiple code access.

Figure 4:
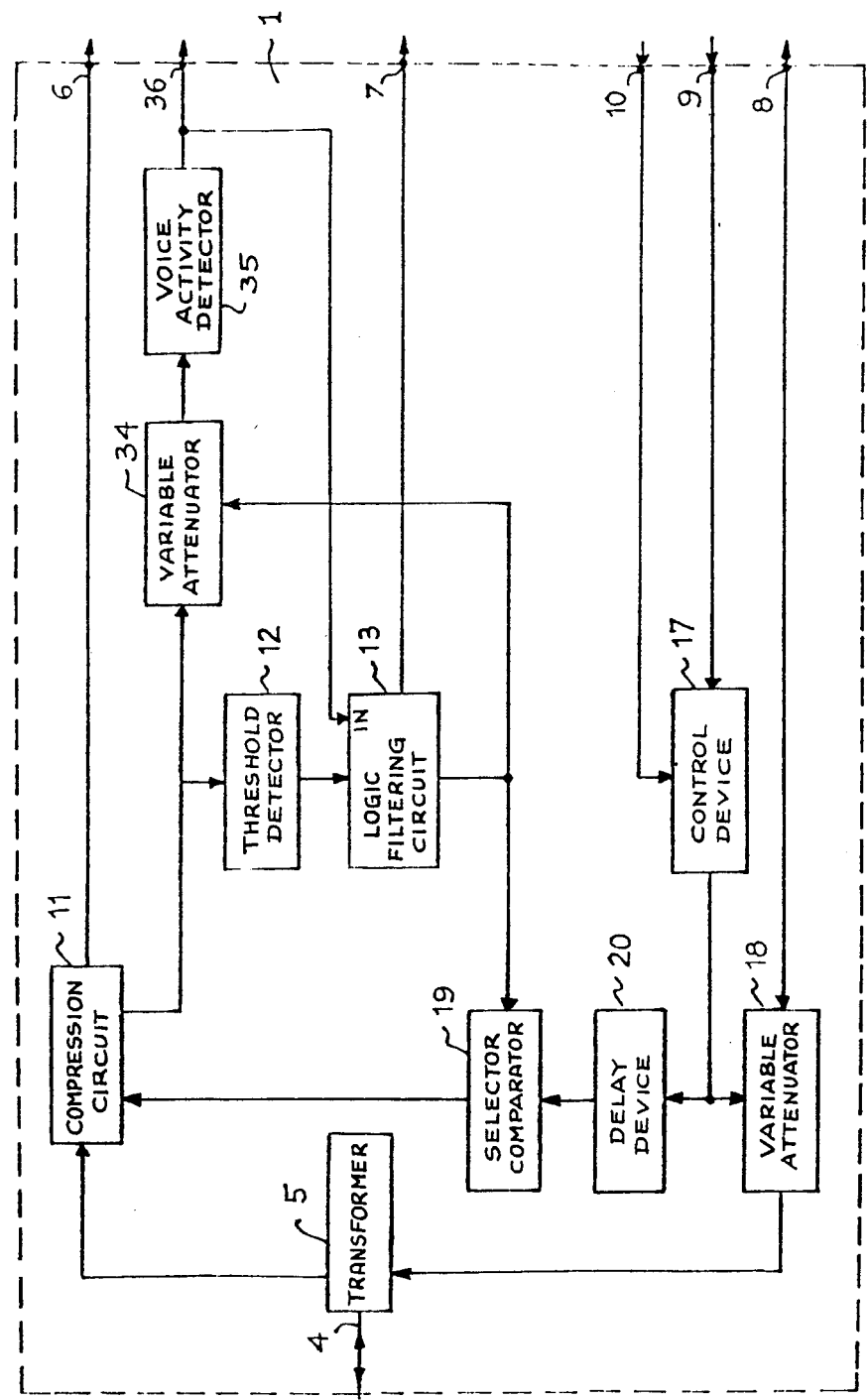
FIG. 4 shows a second embodiment of the invention using the voice activity detector.

FIG. 4 shows one embodiment of the device of the invention adapted to this latter case. The device shown in FIG. 4 is formed by the same elements as those in FIG. 1 which are marked by the same references and it is completed by the addition of a voice activity detector 35 whose input is coupled to the input of the threshold detector 12 through a variable attenuator 34. The variable attenuator 34 is controlled by the signals from the logic filtering circuit 13 and transmits the speech signals entering the threshold detector 12 to the input of the voice activity detector 35. The output of the voice activity detector is connected to the initialization input IN of the logic filtering circuit 13 for commanding, from coder 23 of the filtering logic shown in FIG. 2, the emission of a continuous succession of signals A when there is no voice activity. This arrangement allows, when there is no voice activity, the attenuation of the compression circuit 11 to be adjusted automatically to its minimum level and the attenuation of the variable attenuator 18 to its maximum attenuation level. The output of the voice activity detector 35 is also connected to an output 36 of device 1 for prohibiting transmission by the speech transmission circuits of the transmitter (not shown) when there is no voice activity.

The voice activity detector used for implementing the invention may be of the type shown in the French Pat. application No. 79 24227 filed in the name of the Applicant.

The device of FIG. 4 correctly restores the voice signal when the voice signal over link 4 has priority whereas the signal attenuated by the action of the selector comparator 19 is attenuated to the maximum when the signal is due to an echo. This solution is especially advantageous whenever the second end is formed by a mobile radiotelephone station not having an echo blocking device, in particular when microphone and earphone form a four wire connection, in this case the voice of the speaker at the mobile station undergoes no blocking, only the speaker in the general network must speak louder so as to be heard by the mobile speaker.

This solution is particularly efficient if the link is subject to fading and jamming causing the frequent appearance of cancellation signals at input 10. After a certain time, there is integration of the errors and the levels entering comparator 19 no longer have any meaning. The use of the voice activity detector allows the position of the attenuators 15,16 and 18 to be reinitialized by starting from the same value at each beginning of a voice activity period.

The invention is not limited to the devices which have just been described, it goes without saying that it also applies to other embodiments, more especially to those which integrate the functions which have just been described in a microprocessor which groups together all the digital processing effected on the speech signal. In particular, in this latter embodiment, the voice activity detection function may be easily integrated with the other computing functions of the microprocessor and in particular with those for computing the control signals of the attenuators, these latter being already indicative of the presence of voice activity.

The fields of application of the invention include the cases of difficult telephone radioelectric links where, because of the connection of one end to at least a two-wire network or by using free-hand dialogue over a loudspeaker, return reinjection may occur.

The use of an auxiliary level channel improves the quality and allows the coding to be used most advantageously by adjusting the level of the voice to the correct value situated at an equal distance between saturation and quantization noise.

The invention is not limited to a particular method of coding voice signals, it applies on the contrary to all the digital or analog processes for coding same.

In analog operation, the auxiliary channel may transmit the level information in digital form by frequency multiplexing with the speech, in the way already used in SYNCOMPEX.

In digital operation, the transmission may be effected at average speed in V-UHF with coding on the order of 16 Kbits/s on these fixed frequency or frequency jump channels or at a reduced speed of about 2400 bits/s by vocoding in all the ranges.

We claim:
1. A speech processing device for processing reception voice signals from a radio transmitter/receiver having main and auxiliary channels into expanded voice signals and processing transmission voice signals into compressed voiced signals to be applied to said radio transmitter/receiver comprising:
   means for compressing a volume range of said transmission voice signal to form said compressed voice signals, said compressing means including at least one variable transmission attenuator;
   means for expanding a volume range of said reception voice signals to provide said expanded voice signals;
   means for controlling said expanding means in accordance with attenuation information from said radio transmitter/receiver auxiliary channel;
   logic filtering means, coupled to said compressing means, for controlling said at least one variable transmission attenuator to maintain said compressed voice signals at a substantially constant level and for providing attenuation values to said radio transmitter/receiver auxiliary channel, said logic filtering means causing said attenuation values to vary in substantially constant steps corresponding to a variation in a level of said transmission voice signals; and
   selector comparator means, coupled to said controlling means, said logic filtering means and said compressing means, for determining a highest value of

(a) said attenuation values, and (b) said attenuation information, and for adjusting said at least one variable transmission attenuator to a value of attenuation corresponding to said highest value.

2. A device according to claim 1 wherein said controlling means inhibits said attenuation information when a transmission fault occurs.

3. A device according to claim 1 further including voice activity detector means, coupled to said compressing means, for inhibiting transmission of said compressed voice signals when speech information is absent.

4. A device according to claim 3 further including variable attenuator means, coupled to said voice activity detector means, said compressing means and said logic filtering means, for attenuating, in response to said attenuation values, signals applied to said voice activity detector means to prohibit echoes from triggering said voice activity detecting means so that said compressing means dos not output echoes.

5. A device according to claim 4 further including threshold detector means, coupled between said compressing means and said logic filtering means, for providing information to said logic filtering means regarding said variation of said level of said transmission voice signals, and wherein said logic filtering means provides said attenuation values which are incrementable and are represented by a succession of bits having a first configuration when said level is in increasing phase, a second configuration when said level is in decreasing phase, and a third configuration when said level is substantially constant.

6. A device according to claim 5 wherein said incrementable attenuation values are coded in delta code.

7. A device according to claim 6 further including a delay device coupled between said controlling means and said selector comparator means.

8. A device according to claim 7 wherein said delay device passes said attenuation information to said comparator means without delay when said level is in increasing phase, but delays said attenuation information when said level is in decreasing phase.

9. An analog speech transmission system, comprising:
a radio transmitter/receiver having an auxiliary channel which is frequency multiplexed; and
a speech processing device for processing reception voice signals from said radio transmitter/receiver into expanded voice signals and processing transmission voice signals into compressed voice signals to be applied to said radio transmitter/receiver, said device including:
means for compressing a volume range of said transmission voice signals to form said compressed voice signals, said compressing means including at least one variable transmission attenuator;
means for expanding a volume range of said reception voice signals to provide said expanded voice signals;
means for controlling said expanding means in accordance with attenuation information from said radio transmitter/receiver auxiliary channel;
logic filtering means, coupled to said compressing means, for controlling said at least one variable transmission attenuator to maintain said compressed voice signals at a substantially constant level, and for providing attenuation values to said radio transmitter/receiver auxiliary channel, said logic filtering means causing said attenuation values to vary in substantially constant steps corresponding to a variation in a level of said transmission voice signals; and
selector comparator means, coupled to said controlling means, said logic filtering means and said compressing means, for determining a highest value of (a) said attenuation values, and (b) said attenuation information, and for adjusting said at least one variable transmission attenuator to a value of attenuation corresponding to said highest value.

10. A system according to claim 9 wherein said device further includes:
voice activity detector means, coupled to said compressing means, for inhibiting transmission of said compressed voice signals when speech information is absent;
variable attenuator means, coupled to said voice activity detector means, said compressing means, and said logic filtering means, for attenuating, in response to said attenuation values, signals applied to said voice activity detector means to prohibit echoes from triggering said voice activity detector means so that said compressing means does not output echoes;
threshold detector means, coupled between said compressing means and said logic filtering means, for providing information to said logic filtering means regarding said variation of said level of said transmission voice signals, and wherein said logic filtering means provides said attenuation values which are incrementable and are represented by a succession of bits having a first configuration when said level is in increasing phase, a second configuration when said level is in decreasing phase, and a third configuration when said level is substantially constant, said incrementable attenuation values being coded in delta code; and
delay means, coupled between said controlling means and said selector means, for passing said attenuation information to said comparator means without delay when said level is in increasing phase, but delaying said attenuation information when said level is in decreasing phase.

11. A digital speech transmission system wherein voice signals are multiplexed in packets in time, comprising:
a radio transmitter/receiver having an auxiliary channel; and
a speech processing device for processing reception voice signals from said radio transmitter/receiver into expanded voice signals and processing transmission voice signals into compressed voice signals to be applied to said radio transmitter/receiver, said device including:
means for compressing a volume range of said transmission voice signals to form said compressed voice signals, said compressing means including at least one variable transmission attenuator;
means for expanding a volume range of said reception voice signals to provide said expanded voice signals;
means for controlling said expanding means in accordance with attenuation inforamtion from said radio transmitter/receiver auxiliary channel;

logic filtering means, coupled to said compressing means, for controlling said at least one variable transmission attenuator to maintain said compressed voice signals at a substantially contant level and for providing attenuation values to said radio transmitter/receiver auxiliary channel, said logic filter means causing said attenuation values to vary in substantially constant steps corresponding to a variation in a level of said transmission voice signals; and selector comparator means, coupled to said controlling means, said logic filtering means and said compressing means, for determining a highest value of (a) said attenuation values, and (b) said attenuation information, and for adjusting said at least one variable transmission attenuator to a value of attenuation corresponding to said highest value.

12. A system according to claim 11 wherein said device further includes:

voice activity detector means, coupled to said compressing means, for inhibiting transmission of said compressed voice signals when speech information is absent;

variable attenuator means, coupled to said voice activity detector means, said compressing means, and said logic filtering means, for attenuating, in response to said attenuation values, signals applied to said voice activity detector means to prohibit echoes from triggering said voice activity detector means so that said compressing means does not output echoes;

threshold detector means, coupled between said compressing means and said logic filtering means, for providing information to said logic filtering means regarding said variation of said level of said transmission voice signals, and wherein said logic filtering means provides said attenuation values which are incrementable and are represented by a succession of bits having a first configuration when said level is in increasing phase, a second configuration when said level is in decreasing phase, and a third configuration when said level is substantially constant, said incrementable attenuation values being coded in delta code; and delay means, coupled between said controlling means and said selector means, for passing said attenuation information to said comparator means without delay when said level is in increasing phase, but delaying said attenuation information when said level is in decreasing phase.

13. A speech processing device for processing reception voice signals from a radio transmitter/receiver having an auxiliary channel into expanded voice signals and processing transmission voice signals into compressed voice signals to be applied to said radio transmitter/receiver, comprising:

means for compressing a volume range of said transmission voice signals to form said compressed voice signals, said compressing means including at least one variable transmission attenuator;

means for expanding a volume range of said reception voice signals to provide said expanded voice signals; and processing means for (1) controlling said expanding means in accordance with attenuation information from said radio transmitter/receiver auxiliary channel, (2) controlling said at least one variable transmission attenuator to maintain said compressed voice signals at a substantially constant level and for providing attenuation values to said radio transmitter/receiver auxiliary channel, said processing means causing said attenuation values to vary in substantially constant steps corresponding to a variation in a level of said transmission voice signals, and (3) determining a highest value of (a) said attenuation values, and (b) said attenuation information, and for adjusting said at least one variable transmission attenuator to a value of attenuation corresponding to said highest value.

14. A device according to claim 13 wherein said processing means (4) inhibits transmission of said compressed voice signals when speech information is absent, (5) attenuates, in response to said attenuation values, signals applied to said processing means to prohibit echoes from triggering said processing means so that said device does not output echoes, and (6) providing information regarding said variation of said level of said transmission voice signals, and wherein said attenuation values are incrementable and are represented by a succession of bits having a first configuration when said level is in increasing phase, a second configuration when said level is in decreasing phase, and a third configuration when said level is substantially constant, said attenuation values being coded in delta code.

* * * * *